US012705376B1

(12) United States Patent
Chong et al.

(10) Patent No.: US 12,705,376 B1

(45) Date of Patent: Aug. 11, 2026

(54) MACHINE READABLE POLICY FOR REGISTER ACCESS PERMISSIONS

(71) Applicant: Amazon Technologies, Inc., Seattle, WA (US)

(72) Inventors: Nathan Yong Seng Chong, Ponte Vedra, FL (US); Ali Ghassan Saidi, Austin, TX (US); Andreea Florescu, Palma de Mallorca (ES)

(73) Assignee: Amazon Technologies, Inc., Seattle, WA (US)

( * ) Notice: Subject to any disclaimer, the term of this patent is extended or adjusted under 35 U.S.C. 154(b) by 16 days.

(21) Appl. No.: 18/902,198

(22) Filed: Sep. 30, 2024

(51) Int. Cl.
*G06F 21/60* (2013.01)
*G06F 21/53* (2013.01)

(52) U.S. Cl.
CPC ............ *G06F 21/604* (2013.01); *G06F 21/53* (2013.01)

(58) Field of Classification Search
CPC ............................... G06F 21/604; G06F 21/53
See application file for complete search history.

(56) References Cited

U.S. PATENT DOCUMENTS

2009/0125974 A1* 5/2009 Zhang .................... G06F 21/604 726/1
2015/0319160 A1* 11/2015 Ferguson ................ H04L 63/12 726/10
2018/0314846 A1* 11/2018 Schultz ............... G06F 9/45558

OTHER PUBLICATIONS

ARM Developer, "Realm Management Monitor specification," Dec. 2022, DEN0137 1.0-bet2, Section A4.2, pp. 46-48, URL: https://documentation-service.arm.com/static/63a16f163f28e5456434c719?token.
O'Hearn, P., "Separation Logic," Communications of the ACM, Feb. 2019, vol. 62(2), pp. 86-95.

* cited by examiner

*Primary Examiner* — Baotran N To
(74) *Attorney, Agent, or Firm* — Weaver Austin Villeneuve & Sampson LLP

(57) ABSTRACT

A machine readable policy generated from a policy specification may be obtained. The machine readable policy may specify an exit reason for a virtual processor (vCPU) to exit execution on a host computing system and a set of register access permissions associated with the exit reason. Upon the vCPU exiting for the exit reason, a separation kernel that separates the hypervisor executing on the host computing system from direct hardware access applies the machine readable policy. Applying the machine readable policy includes determining that the hypervisor is requesting access to a register associated with the vCPU, evaluating the access against the set of register access permissions, and allowing the hypervisor to access the register based on the evaluation.

20 Claims, 8 Drawing Sheets

100

FIRST GUEST VIRTUAL MACHINE (VM) 104A

SECOND GUEST VM 104B

NTH GUEST VM 104N

FIRST VM MANAGER (VMM) 106A

SECOND VMM 106B

NTH VMM 106N

HYPERVISOR 102

HARDWARE INTERFACE

LEVEL 0

LEVEL 1

LEVEL 2

Privilege level

NTH VMM 106N

SECOND VMM 106B

FIRST VMM 106A

HYPERVISOR 204

RESTRICTED INTERFACE 206

NTH GUEST VM 104N

SECOND GUEST VM 104B

FIRST GUEST VM 104A

SEPARATION KERNEL 202

HARDWARE INTERFACE

LEVEL 0

LEVEL 1

LEVEL 2

Privilege level

500

STATIC ACCESS PERMISSIONS TABLE 500

| EXIT REASON 500A | REGISTER IDENTIFIER (ID) 500B | PERMITTED OPERATION TYPE 500C | ALLOWED VALUES FOR WRITE 500D | MASK VALUES FOR WRITE 500E | MASK VALUES FOR READ 500F | • • • |
|---|---|---|---|---|---|---|
| • • • | | | | | | |
| DATA ABORT | ID_X | RW | 0x01 | 0xFFF0 | 0xFF00 | |
| | | R | N/A | N/A | 0xFF00 | |
| | | W | 0x01 | 0xFFF0 | N/A | |
| | ID_Y | W | 0x04 - 0x01 | 0xFF00 | 0xFFFE | |
| | ID_Z | R | N/A | N/A | N/A | |
| | ID_PC | RW | PC VALUE + *N* | 0xFFFF | 0xFFFF | |
| | • • • | | | | | |
| • • • | | | | | | |

FIG. 5

MACHINE READABLE POLICY FOR REGISTER ACCESS PERMISSIONS

BACKGROUND

A virtualized computing system can support execution of a plurality of guest virtual machines (VMs) on the same hardware. Generally, a hypervisor executing on the host computing system is operable to manage the execution of the guest VMs by allocating the underlying system hardware resources such as CPU and memory to individual VMs as required. Each VM may execute its own operating system (OS), and be assigned hardware resources such as a CPU, a network controller, an accelerator, and storage. In some examples, the host computing system executing the hypervisor may be a server for a cloud service provider that provides VMs on demand to support execution of different customer workloads.

BRIEF DESCRIPTION OF THE DRAWINGS

Various embodiments in accordance with the present disclosure will be described with reference to the drawings, in which:

FIG. 5 illustrates an example of a static access permissions table that can be used by the separation kernel to apply the machine readable policy, in accordance with some embodiments;

DETAILED DESCRIPTION

Figure 1:
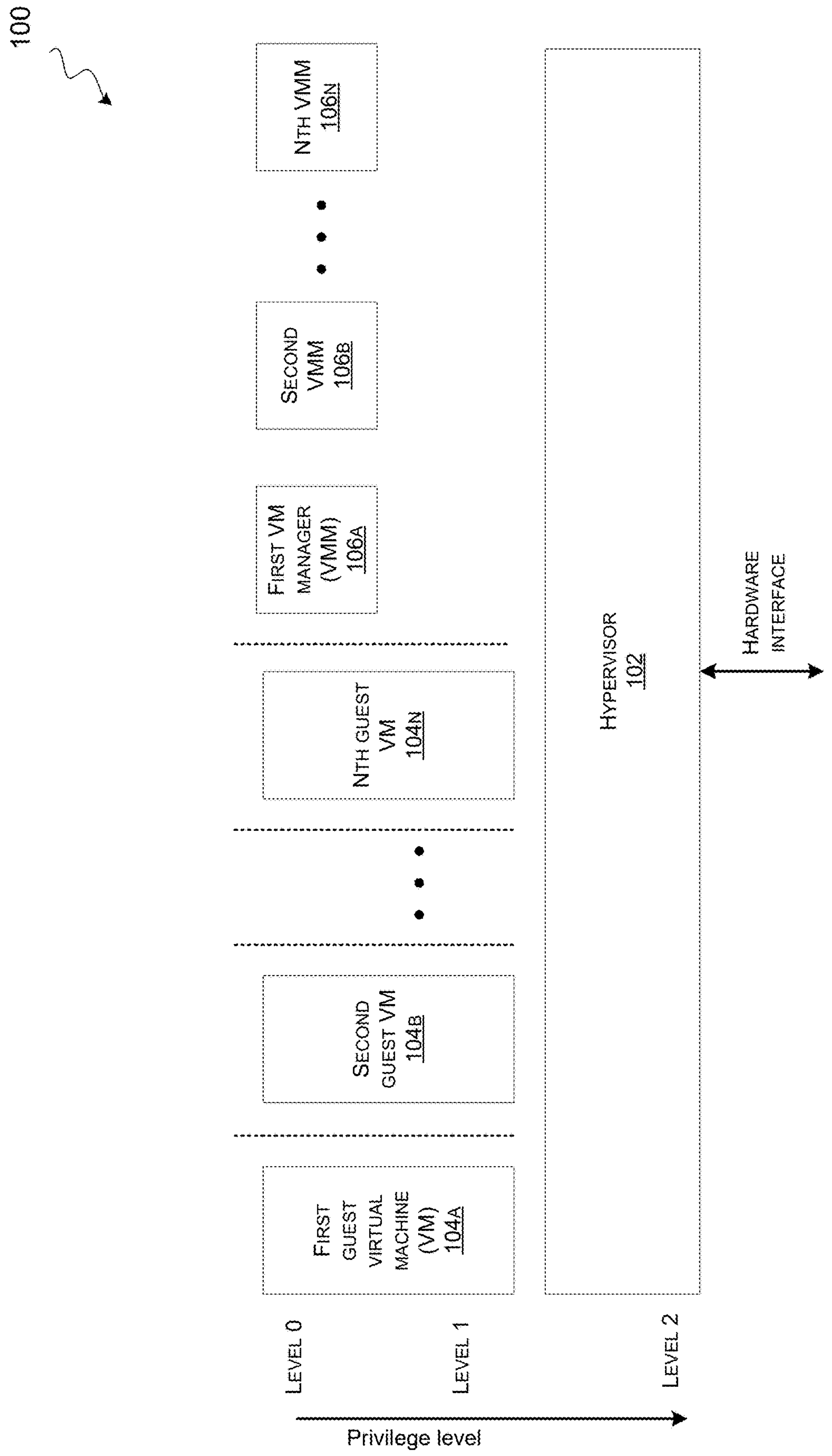
FIG. 1 illustrates an example of a system software stack executing on a host computing system in a virtualized environment.

Some computing systems may support execution of a plurality of guest virtual machines (VMs) that may each execute a corresponding guest virtual processor (vCPU) in a virtualized environment. Generally, a hypervisor executing on a host computing system is operable to create and manage the execution of the guest VMs by allocating the underlying system hardware resources to individual guest VMs based on the corresponding applications being executed. In some implementations, the host computing system may be part of a server fleet for a cloud service provider that provides VMs on demand to different customers.

Generally, the hypervisor may execute a vCPU on a physical CPU by context-switching, e.g., by swapping the register state of the vCPU with the physical CPU registers. For example, on a guest entry, the state of the vCPU is restored into the physical CPU, and on a guest exit, the state of the physical CPU is saved into the vCPU. Therefore, the vCPU may represent part of the execution of state of the guest VM. As an example, vCPU registers may be used for storing different states of the vCPU, addresses for different exceptions or faults, timer values, configurations, base addresses for different tables, interrupt status, etc., based on the system architecture. To provide confidentiality and integrity of the guest private data, the hypervisor can be restricted from being given access to the vCPU registers. However, in some scenarios, it may be desirable to give the hypervisor limited access to some of the register states of the vCPU. For example, when a vCPU exits execution on the host processing system, certain vCPU register states can be useful in debugging or finding the root cause that resulted in the vCPU exit. As such, it may be desirable to be able to enforce access policies that are tailored for specific guest requirements.

Techniques described herein can be used to control hypervisor accesses to vCPU register states upon a vCPU exit by applying a machine readable policy using a separation kernel. The separation kernel may be operable to separate the hypervisor from direct hardware access, and evaluate each access against a set of register access permissions specified by the machine readable policy based on an exit reason to determine whether to allow or block the access by the hypervisor. The machine readable policy may be built using different small primitive blocks specified in a policy specification that provide the set of register access permissions corresponding to different vCPU exit reasons. Building a machine-readable policy using small primitive blocks can also provide support for formal verification of the separation kernel.

The set of register access permissions may include static access permissions that are based on predetermined values. Each static access permission may include a register identifier (ID) representing a vCPU register that the hypervisor is allowed to access, and an operation type indicating whether read, write, or both read and write are permitted on the vCPU register. Each static access permission may further include predetermined allowed values for the write operation, and mask values to de-classify only a portion of the vCPU register for the write operation and/or the read operation to the hypervisor to access.

The set of register access permissions may also include dynamic access permissions that are based on a runtime context of the vCPU. For example, the runtime context may include one or more vCPU register values at a time of exit of the vCPU. In some examples, when applying the machine readable policy, a dynamic access permission may be converted into a static access permission using the one or more vCPU register values at the time of exit of the vCPU. For example, applying the machine readable policy by the separation kernel may include determining whether the hypervisor is requesting access to a register associated with the vCPU, and evaluating the access against the set of register access permissions based on the exit reason of the vCPU that caused the vCPU to exit execution. The separation kernel may determine whether to allow or block the hypervisor to access to the register based on the evaluation. The hypervisor can only access the de-classified portion of the vCPU register that it is allowed to access, which can protect the register states of the vCPU and maintain the confidentiality and integrity of the guest private data.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an example of a system software stack 100 executing on a host computing system in a virtualized environment. The host computing system may also include system hardware components that are not shown in FIG. 1 for ease of illustration. In some examples, the host computing system may be a server for a cloud service provider that provides VMs on demand to support execution of different customer workloads. Thus, it is desirable to maintain the security and confidentiality of the customer data during processing.

A hypervisor 102 executing on the host computing system may create separate virtual environments, and may include a hardware interface to access various hardware resources provided by the host computing system 100 for virtualization, such as, processor cores, accelerators, memory, network controllers, storage, peripheral devices, etc. As shown in FIG. 1, the hypervisor 102 can deploy a plurality of guest VMs comprising a first guest VM 104*a*, a second guest VM 104*b*, and an Nth guest VM 104*n*. The hypervisor 102 may also execute N virtual machine managers (VMMs) comprising a first VMM 106*a*, a second VMM 106*b*, and an Nth VMM 106*n* to manage the virtualization of the hardware resources for the corresponding N VMs 104*a*-104*n*.

As shown in FIG. 1, the N VMMs 106*a*-106*n* may execute at the lowest privilege level (e.g., level 0) or unprivileged level. The VMs 104*a*-104*n* may execute at level 0 and the next higher privilege level (e.g., level 1). For example, a guest OS for each VM may execute at level 1, whereas applications for each VM may execute at level 0. The hypervisor 102 may execute at a higher privilege level (e.g., level 2) than the N VMs. The hypervisor 102 may generally support safe partitioning of the host system resources and ensure workload confidentiality between the N VMs and, also between the N VMs and the host. In some implementations, the hypervisor 102 may utilize hardware enforced page tables to ensure that no unauthorized entity has access to any memory pages owned by a VM.

In most implementations, the hypervisor 102 may include two parts: 1) code to manage the mechanisms for partitioning the system hardware resources; and 2) code governing policy decisions such as resource allocation. Some embodiments described herein may use a separation kernel that implements only certain features of the hypervisor 102 that manage the mechanisms for partitioning the host system resources to provide a smaller and more trusted computing base, which can prevent the hypervisor 102 from having direct access to the system hardware resources to avoid any unauthorized accesses that can be made to the physical memory via the hypervisor 102. This is described with reference to FIG. 2.

Figure 2:
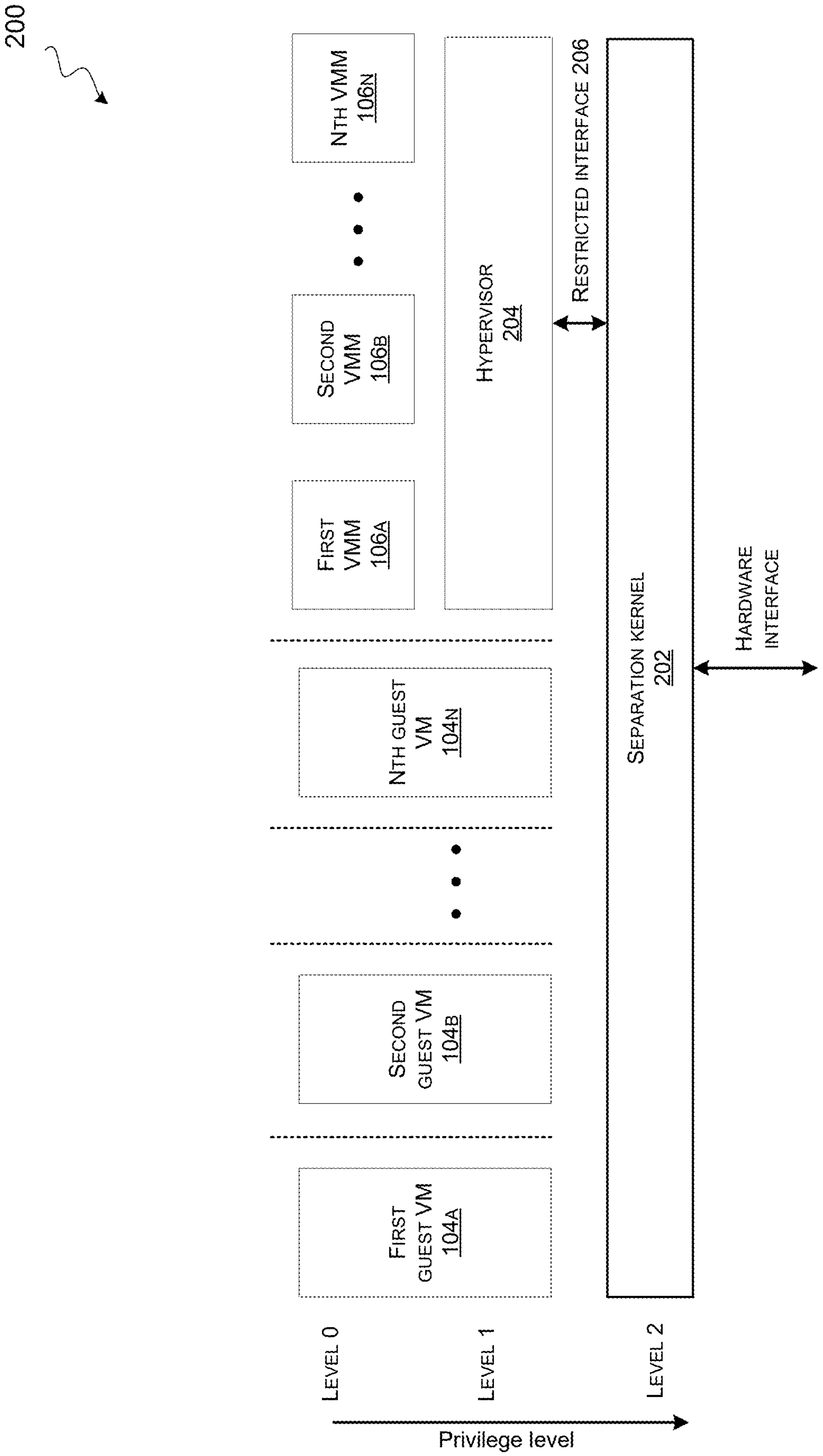
FIG. 2 illustrates an example of a system software stack executing on a host computing system comprising a separation kernel between the hypervisor and the host system hardware, in some embodiments.

FIG. 2 illustrates an example of a system software stack 200 executing on a host computing system comprising a separation kernel between the hypervisor and the host system hardware, in some embodiments.

In some embodiments, a separation kernel 202 that has a higher privilege level (e.g., level 2) than a hypervisor 204 having a level 1 privilege level can be used to restrict accesses of the hypervisor 204 to the system hardware resources. As shown in FIG. 2, the separation kernel 202 may communicate with the hardware resources directly using a hardware interface. All hardware interactions that a hypervisor (e.g., the hypervisor 102 in FIG. 1) typically has direct access to can be mediated through a restricted interface 206 provided by the separation kernel 202. The restricted interface 206 may be provided using an application programming interface (API), or another suitable implementation.

In some implementations, the separation kernel 202 may provide a trusted computing base to manage the mechanisms for partitioning the host system resources, and may be much smaller in size than the remainder of the code in the hypervisor 204 that governs policy decisions such as resource allocation The separation kernel 202 may manage execution of processes and context switching. The separation kernel 202 may also support communicating with the lower privileged software components using an API, e.g., similar to the restricted interface 206 to communicate with the hypervisor 204.

In some embodiments, the separation kernel 202 may be used to control accesses by the hypervisor 204 to registers associated with a virtual processor (vCPU) executing for a guest VM to ensure the confidentiality and integrity of the VMs. This is further described with reference to FIG. 3.

Figure 3:
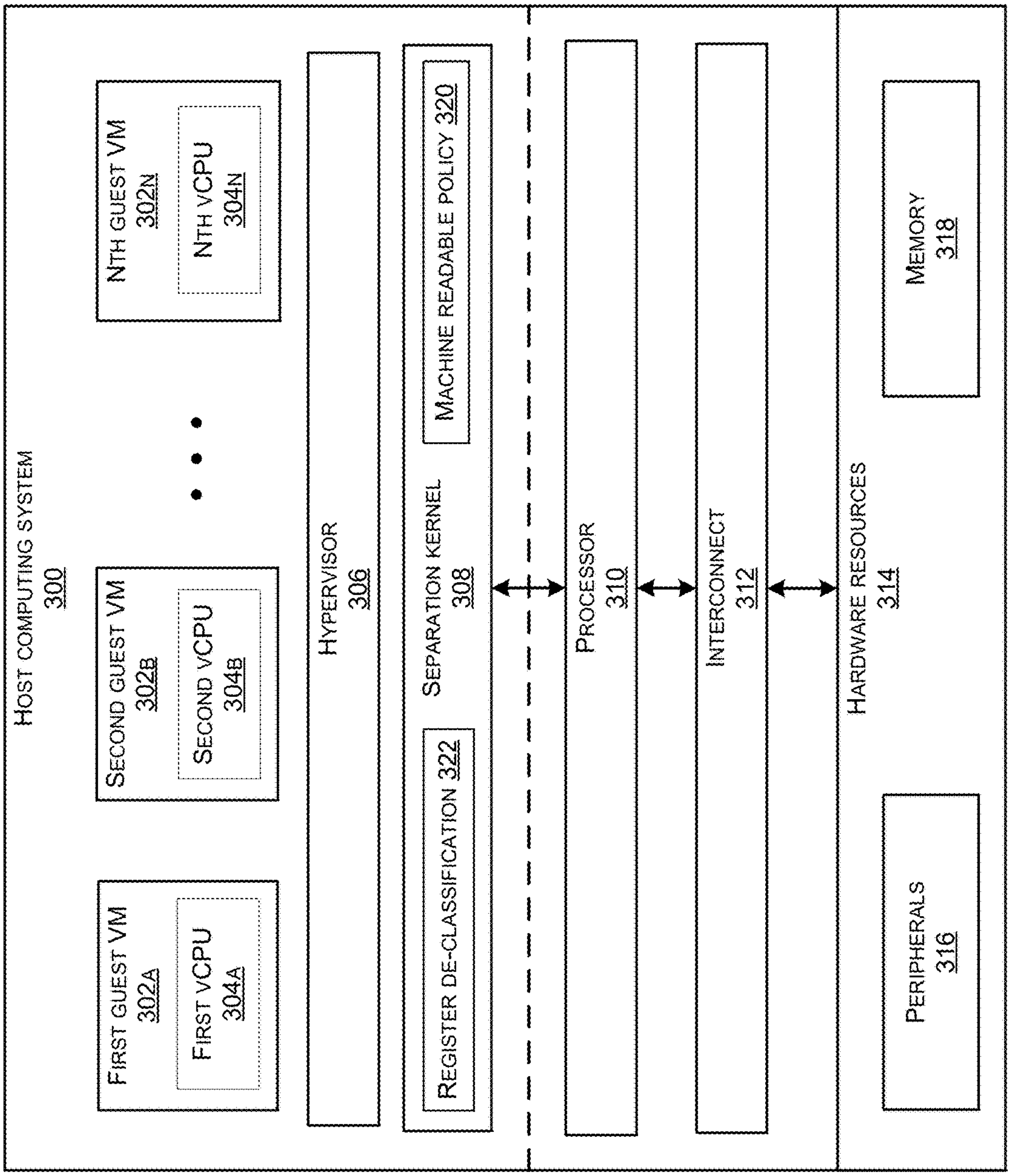
FIG. 3 illustrates an example block diagram of the host computing system comprising the separation kernel to control accesses by the hypervisor to virtual processor (vCPU) registers based on a machine readable policy, in accordance with some embodiments.

FIG. 3 illustrates an example block diagram of a host computing system 300 comprising a separation kernel to control accesses made by the hypervisor to vCPU registers based on a machine readable policy, in accordance with some embodiments. For example, the host computing system 300 may be part of a server fleet for a cloud service provider that provides VMs on demand to different customers.

The host computing system 300 may support execution of a plurality of VMs that may each execute a corresponding guest vCPU in a virtualized environment. For example, each VM may be executing a corresponding customer workload. The plurality of VMs may include a first guest VM 302*a*, a second guest VM 302*b*, and an Nth guest VM 302*n*, respectively executing a first vCPU 304*a*, a second vCPU 304*b*, and an Nth vCPU 304*n*. The guest VMs 302*a*-302*n* may be respective examples of the guest VMs 104*a*-104*n* described with reference to FIGS. 1 and 2.

In some embodiments, a separation kernel 308 may be operable to separate a hypervisor 306 from direct accesses to the system hardware. The system hardware may include a processor 310 coupled to various hardware resources 314 via an interconnect 312. The processor 310 may include a plurality of processing cores. The hardware resources 314 may include peripherals 316, memory 318, among other resources that are not shown in FIG. 3 (e.g., storage device, accelerators, etc.). The peripherals 316 may include a network controller, a universal asynchronous receiver-transmitter (UART) device, a universal serial bus (USB) device, etc. The memory 318 may include SRAMs, HBMs, flash, etc. The separation kernel 308 may be an example of the separation kernel 202, and the hypervisor 306 may be an example of the hypervisor 204, described with reference to FIG. 2.

The separation kernel 308 may perform context switching to execute a vCPU on the physical CPU. Each of the vCPUs 304*a*-304*n* may capture the state of the physical CPU at the guest exit. For example, on a guest entry, the state of the vCPU is restored into the physical CPU, and on a guest exit, the state of the physical CPU is saved into the vCPU.

Therefore, the vCPU may represent part of the execution of state of the guest VM. Each vCPU 304*a*-304*n* may use a corresponding set of registers. For example, vCPU registers may be used for storing different states of the vCPU, addresses for different exceptions or faults, timer values, configurations, base addresses for different tables, interrupt status, etc., based on the processor architecture.

Generally, the register states of the vCPUs are protected from the components of the host computing system 300 other than the guest of the vCPU for the confidentiality and integrity of guest private data. In some implementations, the register states of each vCPU may also include a program counter (or instruction pointer) to maintain the control flow integrity since the program counter stores the memory address of the next instruction to be executed by the vCPU. In some cases, the hypervisor 306 may have access to some of the vCPU register states based on the state of the vCPU and the guest VM. However, in some cases, it may not be desirable for the hypervisor 306 to have access to the full register state of a vCPU, which may jeopardize the confidentiality and integrity of guest private data. When a vCPU is exiting execution on the processor 320, the hypervisor 306 may not need access to all the vCPU registers.

As an example, a first guest VM 302*a* may attempt to write a character to an emulated UART device being emulated by the hypervisor 306. This may cause a vCPU to exit to pass control to the hypervisor to write the character to the emulated UART. Generally, upon a vCPU exit, the hypervisor 306 may have access to all the information needed to interpret the request, e.g., the character the first vCPU 302*a* is trying to emit, so that the hypervisor 306 can take the appropriate action. As an example, the first guest VM 302*a* may be using a register X to write to the emulated UART device. However, it may not be desirable for the hypervisor 306 to have access to contents of the registers Y and Z of the first vCPU 304*a*, which may be storing sensitive data, such as, cryptographic keys.

Thus, in order to prevent any unauthorized accesses, it is desirable for the hypervisor 306 to not have full access to all the register states by default that are being used by the first vCPU 304*a* at the time of exit. Some embodiments can use a separation kernel 308 that separates the hypervisor 306 from direct hardware access to determine whether to allow the hypervisor 306 access to a register by applying a machine readable policy 320. For example, the separation kernel 308 may execute a register de-classification process 322 to apply the machine readable policy 320 to evaluate the access by the hypervisor 306 to the register and the de-classification of the register. The machine readable policy 320 may be generated from a policy specification that may define a plurality of exit reasons for a vCPU to exit execution on the host computing system 300, and a sets of register access permissions associated with each of the exit reasons. The separation kernel 308 may also be used to prevent the hypervisor 306 from accessing vCPU registers of the vCPU during runtime of the vCPU.

Applying the machine readable policy by the separation kernel 308 may include determining an exit reason for the first vCPU 304*a* to exit execution. For example, the exit reason can be a data abort exception. The separation kernel 308 may further determine that the hypervisor 306 is requesting access to a register associated with the first vCPU 304*a*. The separation kernel 308 may also provide an API through the restricted interface 206 to allow the hypervisor 306 to query the vCPU register state. For example, the hypervisor 306 may have executed a hypercall to write to a register (e.g., reg X) associated with the first vCPU 304*a*. The separation kernel 308 may evaluate the access by the hypervisor 306 against the set of register access permissions corresponding to the exit reason that caused the first vCPU 304*a* to exit execution.

The separation kernel 308 may allow the hypervisor to access the register based on the evaluation. For example, a set of register access permissions corresponding to an exit reason may include one or more static access permissions that are based on predetermined values, and one or more dynamic access permissions that are based on a runtime context of the first vCPU 304*a*. The static access permissions may indicate whether a write access, a read access, or both are permitted for a given vCPU register. The static access permissions may further indicate what portions of the given vCPU register can be read or written, and what values are allowed to be written into the given vCPU register. Thus, the separation kernel 308 may only de-classify specific information to the hypervisor 306 based on the policy evaluation specific to the exit reason, which can allow the hypervisor 306 to perform a genuine access to the first vCPU 304*a* register, while preventing the hypervisor 306 from accessing other vCPU registers of the first vCPU 304*a*.

Figure 4:
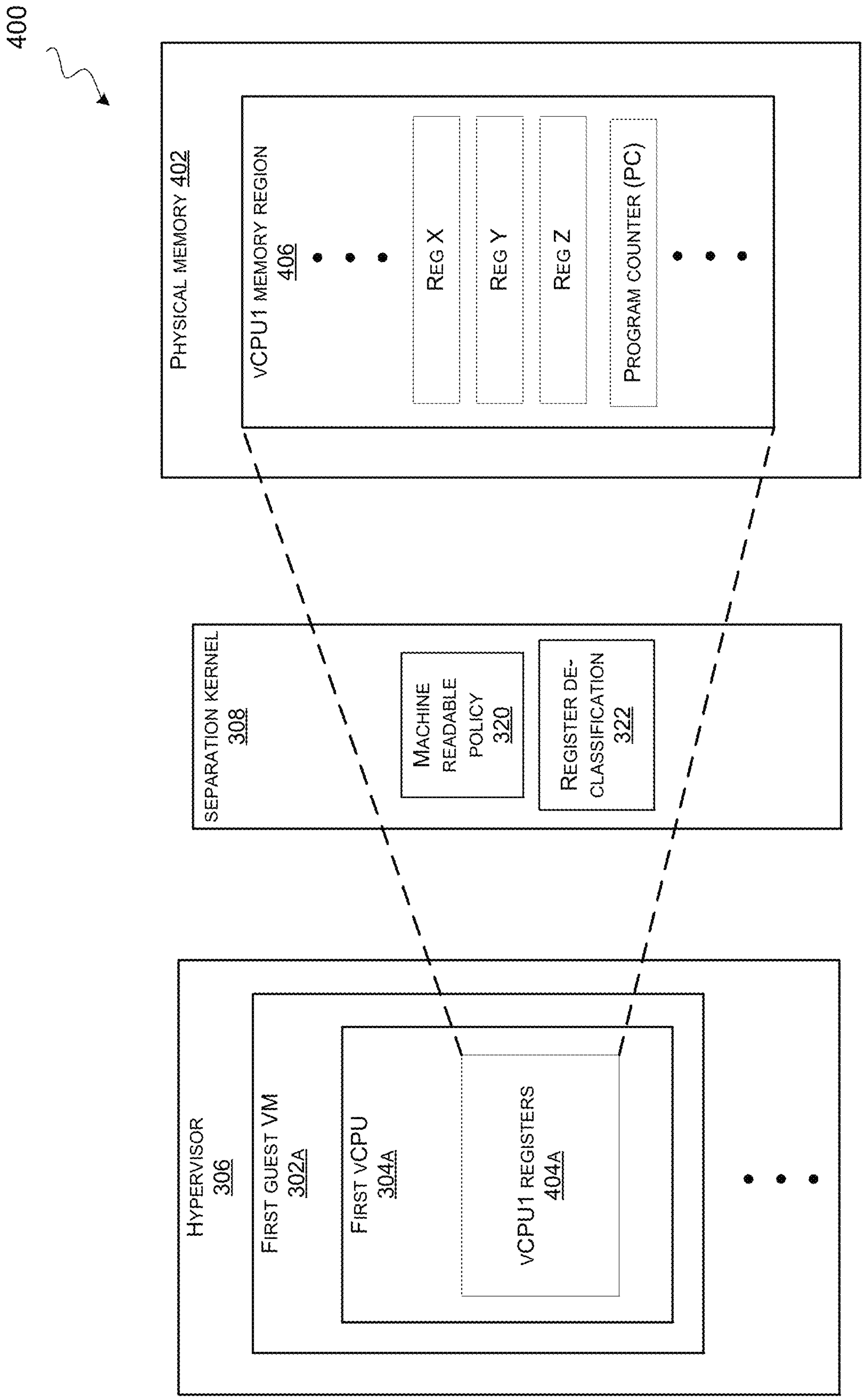
FIG. 4 illustrates an example representation of interception by the separation kernel of hypervisor accesses to the vCPU registers, in accordance with some embodiments.

FIG. 4 illustrates an example representation 400 of interception by the separation kernel 308 of hypervisor accesses to the vCPU registers, in accordance with some embodiments.

As an example, the first vCPU 304*a* may include vCPU1 registers 404*a* mapped to a vCPU1 memory region 406 in a physical memory 402. As described with reference to FIG. 3, the separation kernel 308 may apply the machine readable policy 320 to the accesses made by the hypervisor 306 to any of the vCPU1 registers 404*a* upon exit of the first vCPU 304*a* from execution. The vCPU1 registers 404*a* may include a plurality of registers including registers X, Y, Z, and a program counter (PC). The separation kernel 308 may be operable to intercept the access requests by the hypervisor 306 to the vCPU1 registers 404*a* to prevent the hypervisor 306 from accessing the vCPU1 registers 404*a* during runtime of the first vCPU 304*a*. The separation kernel 308 may also be operable to apply the machine readable policy 320 to evaluate each access against a set of register access permissions associated with the vCPU register being accessed upon an exit state of the first vCPU 304*a* from executing on the host computing system 300.

FIG. 5 illustrates an example of a static access permissions table 500 that can be used by the separation kernel 308 to apply the machine readable policy 320, in accordance with some embodiments.

The static access permissions table 500 may include a plurality of static access permissions associated with each vCPU register for a plurality of exit reasons. As shown in FIG. 5, the static access permissions table 500 may include an exit reason 500*a*, a register identifier (ID) 500*b*, a permitted operation type 500*c*, allowed values for write 500*d*, mask values for write 500*e*, and mask values for read 500*f*. The static access permissions table 500 may include additional fields based on the implementation.

The static access permissions table 500 shown in FIG. 5 lists different static access permissions and a respective register ID 500*b* for each of the vCPU1 registers X, Y, Z, and the program counter (PC) for a given exit reason 500*a* as "data abort." For example, a value of ID_X for the register ID 500*b* corresponds to the register X, which has predetermined values for the permitted operation type 500*c* as "RW" indicating that both operation types read and write are permitted on the register X. Furthermore, a value of 0x01 for the allowed values for write 500*d* corresponding to the register X indicates that only the value 0x01 is allowed to be written to the register X. Furthermore, a value of 0xFFF0 for the mask values for write 500*e* corresponding to the register X indicates a predetermined mask value of 0xFFF0 to prevent the hypervisor 306 from writing a portion of the register X (e.g., last 4 bits). Furthermore, a value of 0xFF00 for the mask values for read 500*f* corresponding to the register X indicates a predetermined mask value of 0xFF00 to prevent the hypervisor 306 from reading a portion of the register X (e.g., last 8 bits).

Similarly, a value of ID_Y for the register ID 500*b* corresponds to the register Y, which has predetermined values for the permitted operation type 500*c* as "W" indicating that only the operation type write is permitted on the register Y. In this case, the allowed values for read 500*f* is not applicable (N/A). However, a value of 0x04-0X01 for the allowed values for write 500*d* corresponding to the register Y indicates that only the values 0x04, 0x03, 0x02, and 0x01 are allowed to be written to the register Y. Furthermore, a value of 0xFF00 for the mask values for write 500*e* corresponding to the register Y indicates a predetermined mask value of 0xFF00 to prevent the hypervisor 306 from writing a portion of the register Y (e.g., last 8 bits).

Similarly, a value of ID_Z for the register ID 500*b* corresponds to the register Z, which has predetermined values for the permitted operation type 500*c* as "R" indicating that only the operation type read is permitted on the register Z. In this case, the allowed values for write 500*d* and the mask values for write 500*e* are not applicable (N/A). However, a value of 0xFFFE for the mask values for read 500*f* corresponding to the register Z indicates a predetermined mask value of 0xFFFE to prevent the hypervisor 306 from reading a portion of the register Z (e.g., last 1 bit).

Similarly, a value of ID_PC for the register ID 500*b* corresponds to the PC associated with the first vCPU 304*a*, which has predetermined values for the permitted operation type 500*c* as "RW" indicating that both operation types read and write are permitted on the PC. Furthermore, a value of (PC value upon guest exit+N) for the allowed values for write 500*d* corresponding to the PC indicates that only a value that is N more than the PC value at the time of the guest exit is allowed to be written to the PC. N can be a value (e.g., 0x04) to increment the PC to the next instruction. Furthermore, a value of 0xFFFF for the mask values for write 500*e* and a value of 0xFFFF for the mask values for read 500*f* corresponding to the register PC indicates that the hypervisor 306 is allowed to write or read the full PC. Thus, by allowing specific values to be written to the PC can maintain the control flow integrity of the guest VMs.

In some embodiments, the machine readable policy 320 can be implemented using small building blocks or primitives that can be combined for checking different types of access permissions based on the exit reason 500*a*. For example, separate simple primitives can be defined for the permitted operation type 500*c*, allowed values for write 500*d*, mask values for write 500*e*, and mask values for read 500*f* operations in a policy specification using any suitable programming language. The machine readable policy 320 can be generated by combining the appropriate simple building blocks from the policy specification based on the register ID 500*b* (e.g., the vCPU1 register being accessed) and the exit reason 500*a* for checking the accesses to that register by the hypervisor 306.

Initially after a successful VM creation, the hypervisor 306 may not have access to any of the vCPU registers during runtime of the vCPU. However, upon an exit of the vCPU from execution, the machine readable policy 320 may allow the hypervisor 306 access to a vCPU register based on the exit reason 500*a* specific to the register ID 500*b*. In some examples, a dynamic access permission can be converted into a static access permission based on the one or more vCPU register values at the time of exit of the vCPU. For example, when the runtime context of a vCPU indicates an exit from execution, the hypervisor 306 may not be allowed to write or read certain registers or portions of the registers. Thus, appropriate access permissions 500*c*, 500*d*, 500*e*, and 500*f* can be programmed for each register ID 500*b* and the exit reason 500*a* accordingly.

Figure 6:
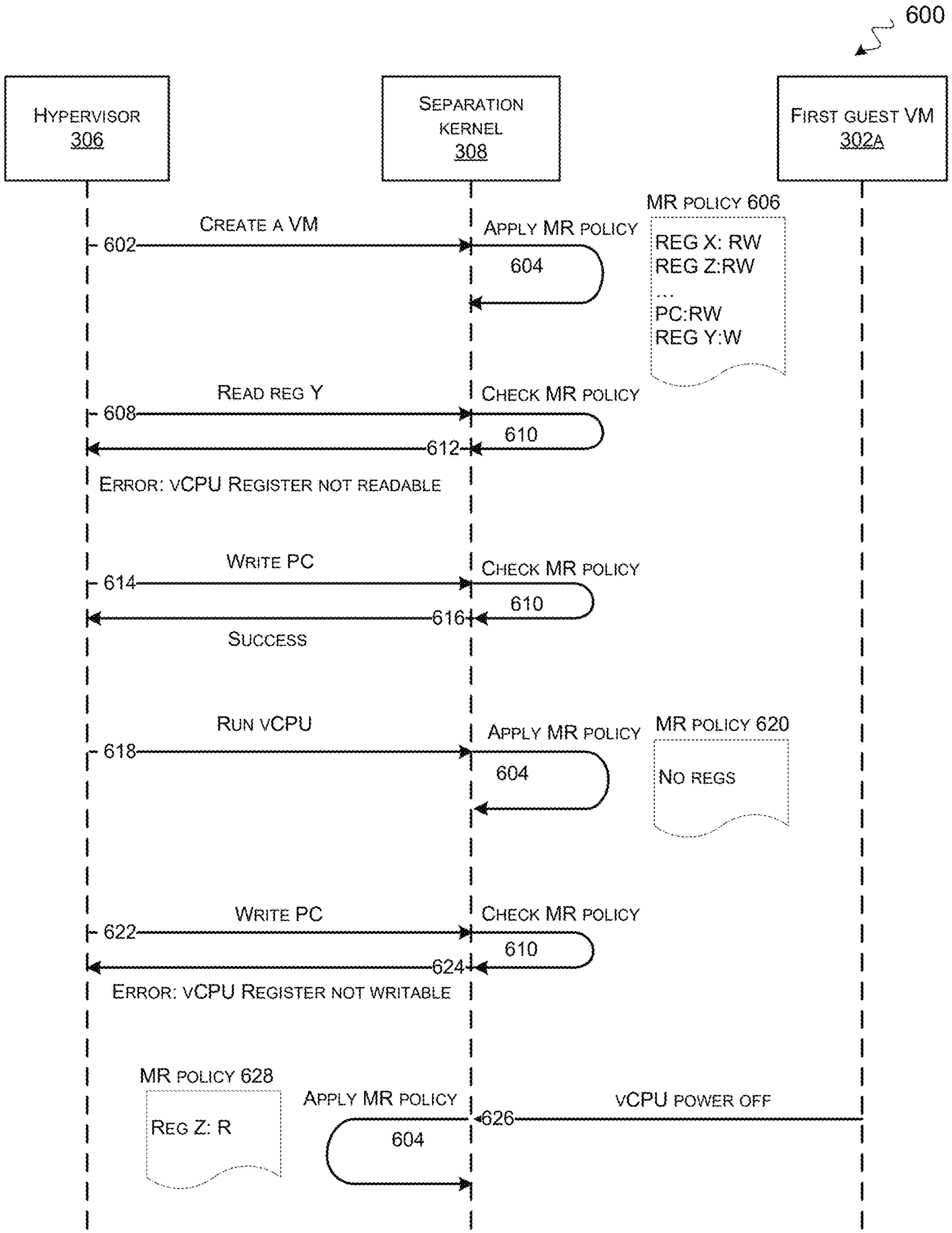
FIG. 6 illustrates an example of a flow diagram for applying the machine readable policy to various accesses made by the hypervisor to the vCPU registers, in accordance with some embodiments.

FIG. 6 illustrates an example of a flow diagram 600 for applying the machine readable policy 320 to various accesses made by the hypervisor 306 to the vCPU registers, in accordance with some embodiments.

For example, as shown in FIG. 6, the hypervisor 306 may perform an operation 602 to create a VM. As an example, the VM may be the first guest VM 302*a*. The separation kernel 308 may perform an operation 604 to apply a machine readable (MR) policy 606. For example, the MR policy 606 may be applied using the static access permissions table 500 and a dynamic access permission based on the runtime context of the vCPU. Since the states for both the first guest VM 302*a* and the first vCPU 304*a* may indicate creating, the MR policy 606 may indicate that access to all the registers are allowed based on the operation type. Thus, as shown in FIG. 6, registers X and Z, and the PC are allowed read and write accesses, however the register Y is only allowed write access.

The hypervisor 306 may perform another operation 608 by sending a request to read the register Y. The separation kernel 308 may determine that the hypervisor 306 is requesting read access to the register Y associated with the first vCPU 304*a*. The separation kernel 308 may perform an operation 610 to check the MR policy 606, which may include evaluating the access to the register Y against the set of register access permissions specified by the MR policy 606. For example, the separation kernel 308 may execute the register de-classification process 322 that includes performing the operation 610 to check the MR policy 606 that evaluates the access to the register Y against the set of register access permissions specified by the MR policy 606. A result 612 of performing the operation 610 may return an error indicating that the register Y is not readable. For example, evaluating the access to the register Y against the set of register access permissions specified by the MR policy 606 may determine that the register Y only has write access permission based on the static access permissions table 500.

The hypervisor 306 may perform another operation 614 by sending a request to write the PC (e.g., to initialize the PC). The separation kernel 308 may determine that the hypervisor 306 is requesting access to the PC. The separation kernel 308 may perform the operation 610 to check the MR policy 606, which may include evaluating the access to the PC against the set of register access permissions specified by the MR policy 606. The execution of the operation 610 may return a success indicating that the register PC can be written. For example, evaluating the access to the PC against the set of register access permissions specified by the MR policy 606 may determine that writes to PC is allowed during creation of the VM instance based on the static access permissions table 500.

The hypervisor 306 may perform another operation 618 to execute the vCPU. The separation kernel 308 may perform the operation 604 to apply an MR policy 620 due to the change in the states of the first guest VM 302*a* and the first vCPU 304*a*. Since the first vCPU 304*a* is in a running state, the MR policy 620 may specify that no vCPU registers are allowed read or write access during runtime of the first vCPU 304*a*. In this case, the separation kernel 308 may block the hypervisor 306 from accessing the registers associated with the first vCPU 304*a*.

The hypervisor 306 may perform another operation 622 by sending a request to write the PC. The separation kernel 308 may determine that the hypervisor 306 is requesting access to the PC, and perform the operation 610 to check the MR policy 620, which may include evaluating the access to the PC against the set of register access permissions specified by the MR policy 620. Thus, execution of the operation 610 may return an error 624 indicating that the PC cannot be written due to the runtime state of the first vCPU 304*a* (e.g., running state).

The first guest VM 302*a* may exit execution due to an exit reason. For example, the first guest VM 302 may perform an operation 626 to power off the vCPU due to a data abort exception, which may cause the first vCPU 304*a* to exit the execution. The separation kernel 308 may perform the operation 604 to apply an MR policy 628, which may indicate that the hypervisor 306 is allowed only a read access to the register Z. Further, the mask value for read 500*f* may indicate what portion of the register Z the hypervisor 306 is allowed to read. Thus, the hypervisor 306 is not allowed accesses to any other registers (e.g., registers X, Y or PC) upon the exit of the first vCPU 304*a* from execution as specified by the MR policy 628, but is only allowed access to the declassified portion of register Z.

As described with reference to FIG. 6, different MR policies 606, 620, and 628 can be applied by the separation kernel 308 to a given vCPU register based on the VM state and the vCPU state considering the predetermined values for the static access permissions and the runtime context of the vCPU to control the accesses by the hypervisor 306. Thus, the unauthorized accesses to the vCPU registers can be blocked, and the confidentiality and integrity of the guest private data can be maintained.

Figure 7:
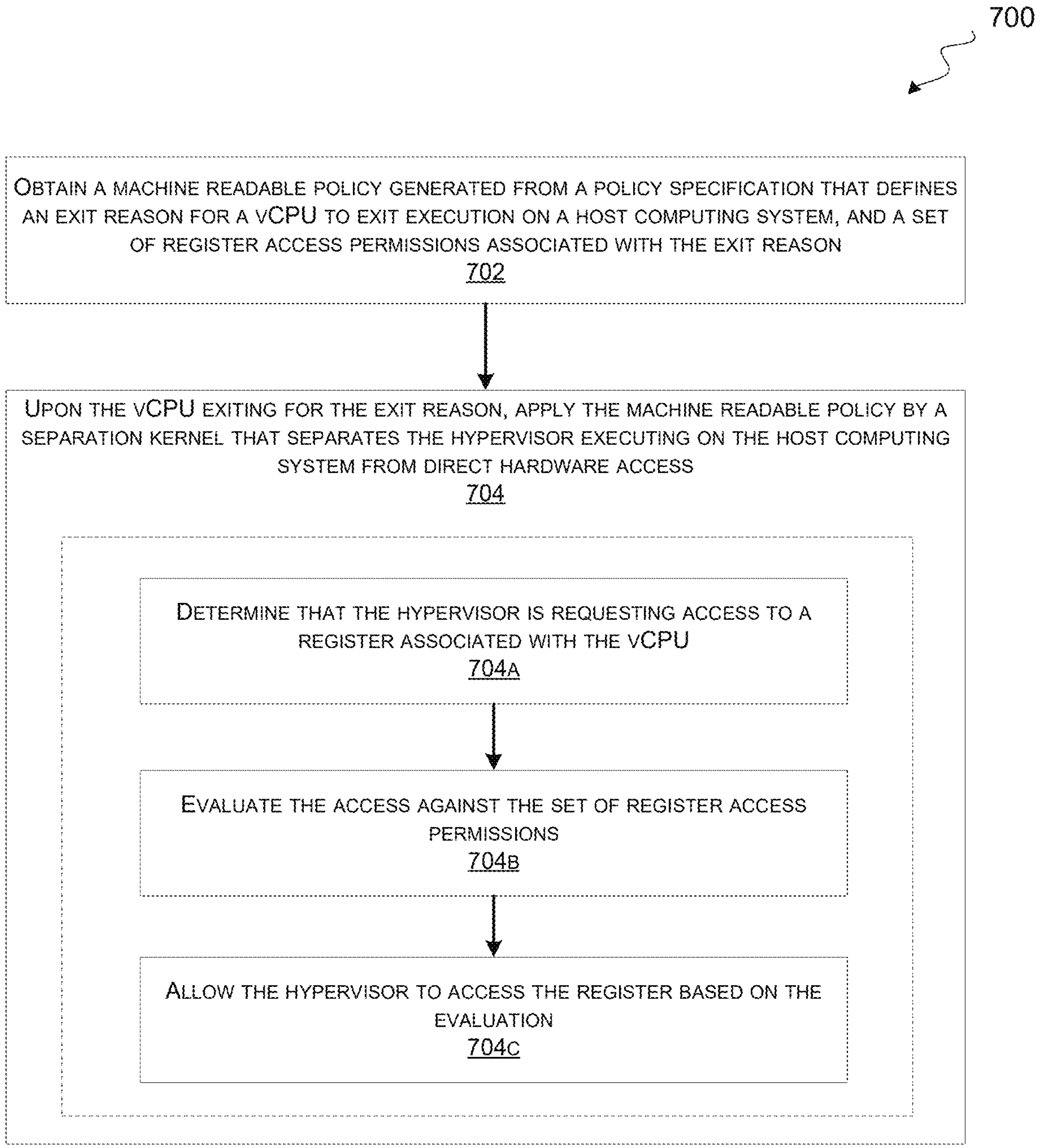
FIG. 7 illustrates an example of a flow diagram for a method for applying the machine readable policy to allow the hypervisor access to a vCPU register upon an exit of the vCPU from execution, in accordance with some embodiments.

FIG. 7 illustrates an example of a flow diagram 700 for a method for applying the machine readable policy to allow the hypervisor access to a vCPU register upon an exit of the vCPU from execution, in accordance with some embodiments. For example, the method may be performed by the separation kernel 202, or the separation kernel 308 to control accesses by the hypervisor 306 to the vCPU registers.

At step 702, the method includes obtaining a machine readable policy generated from a policy specification that defines an exit reason for a vCPU to exit execution on a host computing system, and a set of register access permissions associated with the exit reason. For example, the separation kernel 308 may obtain the machine readable policy 320 that was generated from a policy specification. The policy specification can be defined by the guest user of the vCPU to provide the guest with full control of which vCPU register is granted hypervisor access upon a vCPU exit. As described with reference to the static access permissions table 500 in FIG. 5, the machine readable policy 320 may define a set of register access permissions indicated by the permitted operation type 500*c*, allowed values for write 500*d*, mask values for write 500*e*, and mask values for read 500*f* for each register indicated by the register ID 508 and the exit reason 500*a*.

At step 702, the method includes, upon the vCPU exiting for the exit reason, applying the machine readable policy by a separation kernel that separates the hypervisor executing on the host computing system from direct hardware access. For example, the separation kernel 308 may execute the register de-classification process 322 to evaluate the de-classification of the register upon an access by the hypervisor 306. Applying the machine readable policy may include multiple operations performed in steps 704*a*, 704*b*, and 704*c*. As described with reference to FIG. 6, the first guest VM 302 may perform the operation 626 to power off the first vCPU 304*a* due to a data abort exception, which may cause the first vCPU 304*a* to exit the execution. The separation kernel 308 may apply the MR policy 628 in the exit state of the first vCPU 304*a*.

At step 704*a*, the method includes determining that the hypervisor is requesting access to a register associated with the vCPU. The separation kernel 308 may determine that the hypervisor 306 is requesting access to the register Z associated with the first vCPU 304*a*. For example, the hypervisor 306 may have executed a hypercall to send a read access request to the register Z. The separation kernel 308 may intercept the read access request by the hypervisor 306 to determine whether the access request by the hypervisor 306 is permitted.

At step 704*b*, the method includes evaluating the access against the set of register access permissions. The separation kernel 308 may evaluate the access against the set of register access permissions specific to the register Z and the exit reason being data abort. The separation kernel 308 may evaluate the access against the dynamic access permissions based on the runtime context of the first vCPU 304*a* indicating the exit state. For example, the separation kernel 308 may apply the static access permissions for the exit reason 500*a* indicating the data abort exception for the register ID ID_Z specified in the MR policy 628.

At step 704*c*, the method includes allowing the hypervisor to access the register based on the evaluation. The separation kernel 308 may determine based on the evaluation that the read access to the register Z is allowed by the hypervisor 306, and allow the hypervisor 306 to proceed with the access to the register Z. In some examples, access to other registers (e.g., registers X and Y, and the PC) by the hypervisor 306 may not be allowed to prevent any unauthorized accesses. Thus, preventing the hypervisor from accessing the vCPU registers of the vCPU during runtime of the vCPU, and de-classifying only specific information to the hypervisor for accessing vCPU registers can maintain the confidentiality and integrity of the guest private data. Furthermore, using small machine readable primitives to generate the machine-readable policy can provide support for the formal verification of the separation kernel 308.

Figure 8:
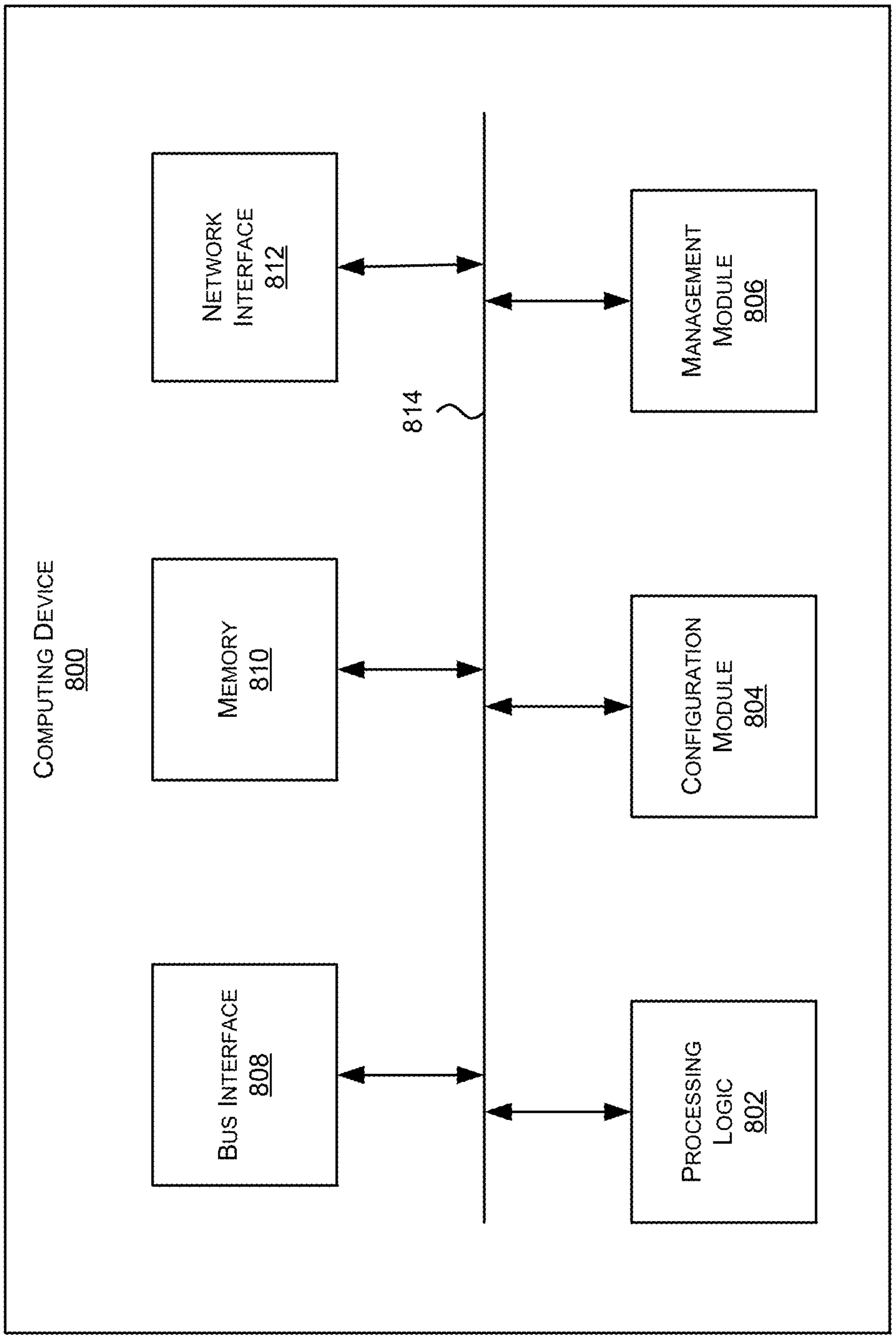
FIG. 8 illustrates an example of a computing device, according to certain aspects of the disclosure.

FIG. 8 illustrates an example of a computing device 800. Functionality and/or several components of the computing device 800 may be used without limitation with other embodiments disclosed elsewhere in this disclosure, without limitations. In some embodiments, the computing device 300 may be an example of the host computing system 300 that is executing the separation kernel 308 to control accesses by the hypervisor 306 to the vCPU registers by applying the machine readable policy 320.

In one example, the computing device 800 may include processing logic 802, a configuration module 804, a management module 806, a bus interface module 808, memory 810, and a network interface module 812. These modules may be hardware modules, software modules, or a combination of hardware and software. In certain instances, modules may be interchangeably used with components or engines, without deviating from the scope of the disclosure. The computing device 800 may include additional modules, which are not illustrated here. In some implementations, the computing device 800 may include fewer modules. In some implementations, one or more of the modules may be combined into one module. One or more of the modules may be in communication with each other over a communication channel 814. The communication channel 814 may include one or more busses, meshes, matrices, fabrics, a combination of these communication channels, or some other suitable communication channel.

The processing logic 802 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 802 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 802 may be stored on a computer-readable storage medium, for example, in the form of a computer program. The computer-readable storage medium may be non-transitory. In some cases, the computer-readable medium may be part of the memory 810.

The memory 810 may include either volatile or non-volatile, or both volatile and non-volatile types of memory. The memory 810 may, for example, include random access memory (RAM), read only memory (ROM), Electrically Erasable Programmable Read-Only Memory (EEPROM), flash memory, and/or some other suitable storage media. In some cases, some or all of the memory 810 may be internal to the computing device 800, while in other cases some or all of the memory may be external to the computing device 800. The memory 810 may store an operating system comprising executable instructions that, when executed by the processing logic 802, provides the execution environment for executing instructions providing networking functionality for the computing device 800. The memory may also store and maintain several data structures and routing tables for facilitating the functionality of the computing device 800.

In some implementations, the configuration module 804 may include one or more configuration registers. Configuration registers may control the operations of the computing device 800. In some implementations, one or more bits in the configuration register can represent certain capabilities of the computing device 800. Configuration registers may be programmed by instructions executing in the processing logic 802, and/or by an external entity, such as a host device, an operating system executing on a host device, and/or a remote device. The configuration module 804 may further include hardware and/or software that control the operations of the computing device 800.

In some implementations, the management module 806 may be configured to manage different components of the computing device 800. In some cases, the management module 806 may configure one or more bits in one or more configuration registers at power up, to enable or disable certain capabilities of the computing device 800. In certain implementations, the management module 806 may use processing resources from the processing logic 802. In other implementations, the management module 806 may have processing logic similar to the processing logic 802, but segmented away or implemented on a different power plane than the processing logic 802.

The bus interface module 808 may enable communication with external entities, such as a host device and/or other components in a computing system, over an external communication medium. The bus interface module 808 may include a physical interface for connecting to a cable, socket, port, or other connection to the external communication medium. The bus interface module 808 may further include hardware and/or software to manage incoming and outgoing transactions. The bus interface module 808 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 808 may include the physical layer for any of these bus protocols, including a connector, power management, and error handling, among other things. In some implementations, the computing device 800 may include multiple bus interface modules for communicating with multiple external entities. These multiple bus interface modules may implement the same local bus protocol, different local bus protocols, or a combination of the same and different bus protocols.

The network interface module 812 may include hardware and/or software for communicating with a network. This network interface module 812 may, for example, include physical connectors or physical ports for wired connection to a network, and/or antennas for wireless communication to a network. The network interface module 812 may further include hardware and/or software configured to implement a network protocol stack. The network interface module 812 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 800 may include multiple network interface modules, each configured to communicate with a different network. For example, in these implementations, the computing device 800 may include a network interface module for communicating with a wired Ethernet network, a wireless 802.11 network, a cellular network, an Infiniband network, etc.

The various components and modules of the computing device 800, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method, comprising:

obtaining a policy specification that defines:

a plurality of exit reasons for a virtual processor (vCPU) to exit execution on a host computing system; and respective sets of register access permissions associated with the exit reasons;

generating a machine-readable policy from the policy specification;

running a separation kernel that separates a hypervisor executing on the host computing system from direct hardware access;

executing the vCPU on the host computing system; and upon the vCPU exiting execution, applying the machine-readable policy by the separation kernel, wherein applying the machine-readable policy includes:

determining an exit reason for the vCPU to exit execution;

determining that the hypervisor is requesting access to a register associated with the vCPU;

evaluating the access against a set of register access permissions corresponding to the exit reason that caused the vCPU to exit execution;

determining that the hypervisor is allowed to access the register; and allowing the hypervisor to proceed with the access.

2. The computer-implemented method of claim 1, wherein the machine-readable policy is usable for formal verification of the separation kernel.

3. The computer-implemented method of claim 1, wherein the set of register access permissions includes static access permissions that are based on predetermined values and dynamic access permissions that are based on a runtime context of the vCPU.

4. The computer-implemented method of claim 3, wherein evaluating the access against the set of access permissions includes:

determining one or more vCPU register values of the runtime context at a time of exit of the vCPU; and converting a dynamic access permission into a static access permission using the one or more vCPU register values.

5. A computer-implemented method, comprising:

obtaining a machine-readable policy generated from a policy specification that defines:

an exit reason for a virtual processor (vCPU) to exit execution on a host computing system; and a set of register access permissions associated with the exit reason; and upon the vCPU exiting for the exit reason, applying the machine-readable policy by a separation kernel that separates a hypervisor executing on the host computing system from direct hardware access, wherein applying the machine-readable policy includes:

determining that the hypervisor is requesting access to a register associated with the vCPU;

evaluating the access against the set of register access permissions; and allowing the hypervisor to access the register based on the evaluation.

6. The computer-implemented method of claim 5, wherein the hypervisor is blocked from accessing registers associated with the vCPU during runtime of the vCPU.

7. The computer-implemented method of claim 5, wherein the set of register access permissions includes one or more static access permissions that are based on predetermined values.

8. The computer-implemented method of claim 5, wherein each static access permission includes:

a register identifier representing a vCPU register that the hypervisor is allowed to access; and an operation type indicating whether read, write, or both read and write are permitted on the vCPU register.

9. The computer-implemented method of claim 8, wherein a static access permission that indicates that the write is permitted further includes information specifying one or more predetermined values that are allowed to be written to the corresponding vCPU register.

10. The computer-implemented method of claim 8, wherein a static access permission that indicates that the write is permitted further includes a predetermined mask value to prevent the hypervisor from writing a portion of the vCPU register.

11. The computer-implemented method of claim 8, wherein a static access permission that indicates that the read is permitted further includes a predetermined mask value to prevent the hypervisor from reading a portion of the vCPU register.

12. The computer-implemented method of claim 5, wherein the set of register access permissions includes one or more dynamic access permissions that are based on a runtime context of the vCPU.

13. The computer-implemented method of claim 12, wherein the runtime context includes one or more vCPU register values at a time of exit of the vCPU.

14. The computer-implemented method of claim 13, wherein evaluating the access against the set of access permissions includes:

determining the one or more vCPU register values at the time of exit of the vCPU; and converting a dynamic access permission into a static access permission using the one or more vCPU register values.

15. The computer-implemented method of claim 5, wherein the policy specification includes a plurality of exit reasons, and a set of register permissions for each of the exit reasons, and wherein upon the vCPU exiting, the separation kernel determines which of the exit reasons caused the vCPU to exit, and applies the set of register permissions corresponding to the determined exit reason.

16. A non-transitory computer readable medium having stored therein instructions that, when executed by one or more processors, cause the one or more processors to perform operations including:

obtaining a machine-readable policy generated from a policy specification that defines:

an exit reason for a virtual processor (vCPU) to exit execution on a host computing system; and a set of register access permissions associated with the exit reason; and upon the vCPU exiting for the exit reason, applying the machine-readable policy by a separation kernel that separates a hypervisor executing on the host computing system from direct hardware access, wherein applying the machine-readable policy includes:

determining that the hypervisor is requesting access to a register associated with the vCPU;

evaluating the access against the set of register access permissions; and allowing the hypervisor to access the register based on the evaluation.

17. The non-transitory computer readable medium of claim 16, wherein the set of register access permissions includes one or more static access permissions that are based on predetermined values.

18. The non-transitory computer readable medium of claim 16, wherein the set of register access permissions includes one or more dynamic access permissions that are based on a runtime context of the vCPU, and wherein the runtime context includes one or more vCPU register values at a time of exit of the vCPU.

19. The non-transitory computer readable medium of claim 18, wherein evaluating the access against the set of access permissions includes:

determining the one or more vCPU register values at the time of exit of the vCPU; and converting a dynamic access permission into a static access permission using the one or more vCPU register values.

20. The non-transitory computer readable medium of claim 16, wherein the policy specification includes a plurality of exit reasons, and a set of register permissions for each of the exit reasons, and wherein upon the vCPU exiting, the separation kernel determines which of the exit reasons caused the vCPU to exit, and applies the set of register permissions corresponding to the determined exit reason.

* * * * *